(12) United States Patent
Nam

(10) Patent No.: US 11,035,066 B2
(45) Date of Patent: Jun. 15, 2021

(54) CLOTHES TREATING APPARATUS

(71) Applicant: LG ELECTRONICS INC., Seoul (KR)

(72) Inventor: Wansik Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/011,094

(22) Filed: Jun. 18, 2018

(65) Prior Publication Data
US 2019/0024288 A1    Jan. 24, 2019

(30) Foreign Application Priority Data

Jun. 23, 2017   (KR) .................. 10-2017-0079826

(51) Int. Cl.
| D06F 37/26 | (2006.01) |
| D06F 39/00 | (2020.01) |
| D06F 58/10 | (2006.01) |
| D06F 58/20 | (2006.01) |
| D06F 39/08 | (2006.01) |
| F16K 15/06 | (2006.01) |
| F22D 5/34  | (2006.01) |
| D06F 58/30 | (2020.01) |
| D06F 25/00 | (2006.01) |

(52) U.S. Cl.
CPC ............ *D06F 37/26* (2013.01); *D06F 39/008* (2013.01); *D06F 39/083* (2013.01); *D06F 58/10* (2013.01); *D06F 58/203* (2013.01); *D06F 58/30* (2020.02); *D06F 25/00* (2013.01); *F16K 15/06* (2013.01); *F22D 5/34* (2013.01)

(58) Field of Classification Search
CPC ............................ F16K 15/06; D06F 39/083
See application file for complete search history.

(56) References Cited

U.S. PATENT DOCUMENTS

| 5,161,574 A    | * | 11/1992 | Chacin .................... F16K 15/06 |
|                |   |         | 137/533.17 |
| 2008/0017256 A1| * | 1/2008  | Thomas ................ F16K 15/023 |
|                |   |         | 137/529 |
| 2008/0314092 A1| * | 12/2008 | Finke .................... D06F 39/008 |
|                |   |         | 68/5 C |
| 2016/0327169 A1| * | 11/2016 | Yazykov ................. F16K 15/06 |

FOREIGN PATENT DOCUMENTS

| CN | 101460772 A    | 6/2009  |
| CN | 103403421 A    | 11/2013 |
| CN | 204739271 U    | 11/2015 |
| EP | 2006436 A2     | 12/2008 |
| EP | 2826909 A1     | 1/2015  |
| KR | 20070074084 A  | 7/2007  |
| WO | 2014058350 A1  | 4/2014  |

* cited by examiner

*Primary Examiner* — Spencer E Bell
(74) *Attorney, Agent, or Firm* — Dentons US LLP

(57) ABSTRACT

A clothes treating apparatus includes a case including a treatment chamber for holding clothes, a steam unit for supplying steam to the treatment chamber, a tank module storing water to be supplied to the steam unit, a valve unit disposed in a flow channel connecting the tank module and the steam unit, a water supply pump for generating driving power to transmit water stored in the tank module to the steam unit, and a control unit controlling the steam unit and the water supply pump, wherein the valve unit opens or closes the flow channel by at least one of water and steam flowing in the flow channel.

17 Claims, 15 Drawing Sheets

832a

832a

832b

CLOTHES TREATING APPARATUS

CROSS-REFERENCE TO RELATED APPLICATION

Pursuant to 35 U.S.C. § 119(a), this application claims the benefit of earlier filing date and right of priority to Korean Application No. 10-2017-0079826, filed on Jun. 23, 2017, the contents of which is incorporated by reference herein in its entirety.

BACKGROUND

1. Field

The present disclosure relates to a clothes treating apparatus.

2. Background of the Disclosure

A clothes treating apparatus includes any apparatus for managing or treating clothes such as washing, drying, wrinkle elimination, and the like, of clothes or bedding at homes and laundries, For example, the clothes treating apparatus includes a washing machine for washing clothes, a dryer for drying clothes, a washer-dryer supporting both a washing function and a drying function, a refresher for refreshing clothes, an iron for eliminating unnecessary wrinkles of clothes or creating required wrinkles, or a steamer for eliminating unnecessary wrinkles of clothes.

The refresher, an apparatus for refreshing clothes, serves to dry clothes, supply fragrance to clothes, prevent generation of static electricity of clothes, or eliminate wrinkles of clothes.

The steamer is an apparatus for simply eliminating wrinkles of clothes by supplying steam to the clothes. Unlike a general iron, a hot plate thereof is not in contact with clothes, the steamer finely eliminates wrinkles of clothes The clothes treating apparatus supporting both function of the refresher and the steamer may serve to eliminate wrinkles and odor of clothes received therein using steam and hot moving air. Through those functions, clothes received in the clothes treating apparatus may obtain an ironing effect as odor particles contaminating the clothes are eliminated or wrinkles are eliminated.

Recently, a washing machine having a steam generator, in particular, a drum-type washing machine, has become prevalent. That is, steam is supplied to laundry before or after washing or during washing to increase a washing effect through a sterilization function, a time reduction, acceleration of activation of a detergent, and the like.

The present disclosure relates to a refresher and a steamer type clothes treating apparatuses described above, but is not limited thereto.

Generally, a valve for blocking water supply to the steam unit or preventing a back flow of steam is provided on a flow channel connecting a steam unit, a water tank, and a water supply pump of a clothes treating apparatus.

The general clothes treating apparatus has an electronic valve, and the flow channel connected to the steam unit may be opened and closed by driving the electronic valve by a control signal from a controller.

Also, the general clothes treating apparatus may have a mechanically driven check valve to open and close the flow channel, apart from the controller.

However, use of the electronic valve increases manufacturing cost of the clothes treating apparatus, relative to the check valve.

Also, a general check valve may serve to prevent back flow of steam, but, after water supply to the steam unit terminates, an air layer is generated in a water supply pump due to negative pressure within the flow channel.

More specifically, when the air layer is generated in the water supply pump, the pump may not operate normally for the next water supply operation, causing user inconvenience or breakdown of the clothes treating apparatus.

SUMMARY

Therefore, an aspect of the present disclosure is to provide a clothes treating apparatus having a valve unit which opens a flow channel during a water supply operation and closing the flow channel during a steam operation using a structural characteristic of a mechanical valve.

Another aspect of the present disclosure is to provide a clothes treating apparatus having a valve unit capable of preventing formation of an air layer within a water supply pump during a water supply operation, as well as preventing a back flow of steam during a steam operation.

Another aspect of the present disclosure is to provide a clothes treating apparatus having a mechanical valve, rather than an electronic valve, reducing manufacturing cost.

Another aspect of the present disclosure is to provide a clothes treating apparatus having a mechanical valve, rather than an electronic valve, saving a driving current required for driving the electronic valve.

To achieve these and other advantages and in accordance with the purpose of this specification, as embodied and broadly described herein, a clothes treating apparatus includes: a case in which a treatment chamber for holding clothes is provided; a steam unit supplying steam to the treatment chamber; a tank module storing water to be supplied to the steam unit; a valve unit disposed in a flow channel connecting the tank module and the steam unit; a water supply pump generating driving power to transmit water stored in the tank module to the steam unit; and a control unit controlling the steam unit and the water supply pump, wherein the valve unit opens or closes the flow channel by at least one of water and steam flowing in the flow channel.

When the water supply pump operates, the valve unit may open the flow channel by water flowing in the flow channel.

When the steam unit generates steam, the valve unit may close the flow channel by the generated steam.

The valve unit may be a mechanical valve operating independently from the controller.

The valve unit may include a main body having a hollow portion therein and a rod member provided to be movable within the main body.

The valve unit may be implemented in a first state in which the rod member moves toward the steam unit within the hollow portion to open the hollow portion to allow water supplied from the tank module to flow and in a second state in which the rod member moves toward the tank module within the hollow portion to close the hollow portion to prevent a backflow of steam generated by the steam unit.

A portion of the follow channel in which the valve unit is provided may be formed in a vertical direction with respect to the ground, and the valve unit may be implemented in the first state in which the rod member moves downwards within the hollow portion to open the hollow portion to allow water supplied from the tank module to flow when the steam unit is stopped and the second state in which the rod member moves upwards within the hollow portion to close the hollow portion to prevent a backflow of steam generated by the steam unit when the steam unit operates.

The rod member may be positioned on a lower side within the hollow portion due to gravity when both the water supply pump and the steam unit are stopped.

When steam is generated by the steam unit, the rod member may move upwards within the hollow portion by air pressure of the generated steam.

The valve unit may have a cylindrical shape and may include: a first ring protruding from an outer circumferential surface of the valve unit; a second ring protruding from an inner circumferential surface of the valve unit; and a first rib protruding from one surface of the ring in a flow direction of water.

The rod member may include a first part provided at one end of the rod member adjacent to the tank module and caught by one surface of the second ring when water is supplied; and a second part provided at other end of the rod member adjacent to the steam unit and caught by a surface different from the one surface of the second ring when steam is generated.

The first part of the rod member may include at least one hole and a hook provided to be caught by the second ring.

The hole may be provided on an inner circumferential surface of the hook.

When the water supply pump operates, the hook may be mounted on one surface of the second ring adjacent to the tank module.

The first part of the rod member may be elastically deformed by an external force.

One surface of the first part of the rod member may be gentle to minimize resistance with respect to water flowing in the flow channel.

One end of the first part of the rod member adjacent to the water supply tank may be narrower than one end of the first part of the rod member adjacent to the steam unit.

One end of the first part of the rod member adjacent to the water supply tank may be smaller than a diameter of a circle formed by the second ring, and one end of the first part of the rod member adjacent to the steam unit may be larger than the diameter of the circle.

The second part of the rod member may include a sealing member closing the hollow portion when in contact with the second ring; and a damper fixing the sealing member.

When the rod member moves toward the tank module due to air pressure of steam generated by the steam unit, the sealing member may be tightly attached to one surface of the second ring adjacent to the steam unit to close the hollow portion.

The second ring may include a second rib protruding from one surface thereof adjacent to the steam unit, and when the rod member moves toward the tank module, the sealing member may be tightly attached to the second rib.

The sealing member may include a first plate and a second plate.

The first plate may be larger than the second plate.

The second plate may be thicker than the first plate.

The sealing member may be formed to be elastically deformed by an external force.

The second part of the rod member may further include a third rib radially protruding from the rod member.

The third rib may be formed to prevent the rod member from being restrained within the main body due to a foreign object present within the hollow portion.

The third rib may be formed to guide a direction in which the rod member is oriented, when the rod member moves within the main body.

According to the clothes treating apparatus of the present disclosure, since the mechanical valve, instead of an electronic valve, is provided in the flow channel connected to the steam unit, manufacturing cost may be reduced.

Also, according to the present disclosure, since an electronic valve is eliminated from the clothes treating apparatus, a driving current required for driving the electronic valve may be secured.

Also, according to the present disclosure, since the flow channel is opened when water is supplied to the steam unit and closed when steam is generated, using the structural characteristics of the mechanical valve, backflow of steam may be prevented.

Also, according to the present disclosure, generation of an air layer in the flow channel connected to the valve when an operation of supplying water to the steam unit is performed and the water supply operation terminates may be prevented.

That is, according to the structural characteristics of the valve of the present disclosure, since an air layer is not generated within the flow channel or the pump due to negative pressure after water supply to the steam unit terminates, stability of the clothes treating apparatus may be enhanced.

Further scope of the present application will become more apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION

Description will now be given in detail of the exemplary embodiments, with reference to the accompanying drawings. For the sake of brevity with reference to the drawings, the same or equivalent components will be provided with the same reference numbers, and description thereof will not be repeated.

Hereinafter, a clothes treating apparatus and a control method thereof according to embodiments of the present disclosure will be described with reference to the accompanying drawings.

Figure 1:
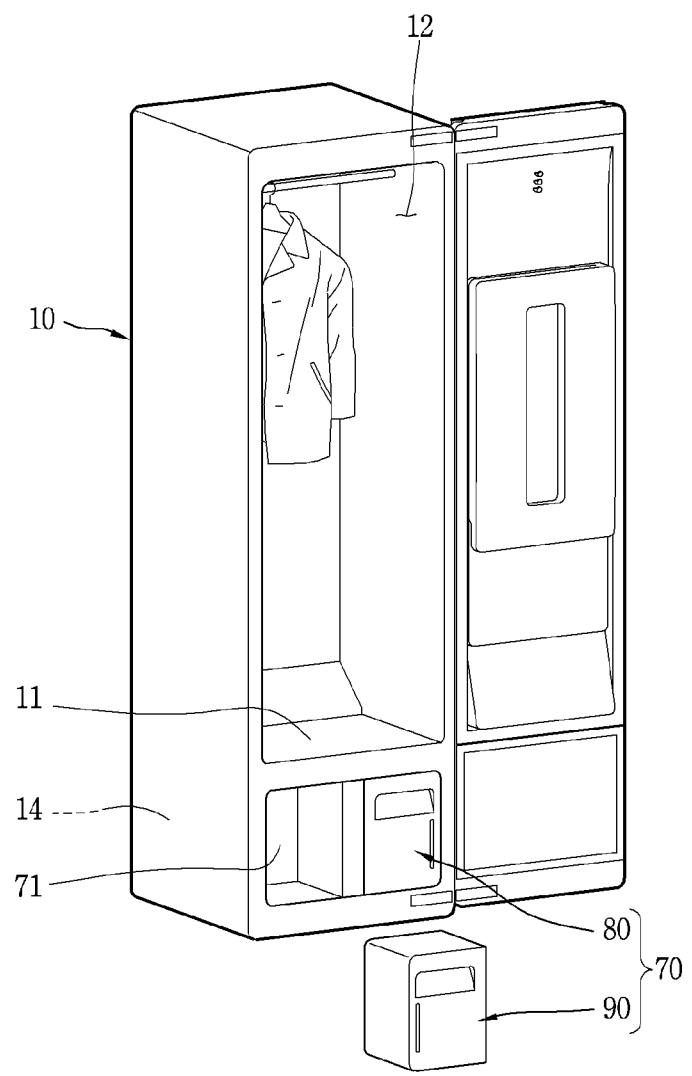
FIG. 1 is a perspective view of a clothes treating apparatus according to an embodiment of the present disclosure.
Figure 2:
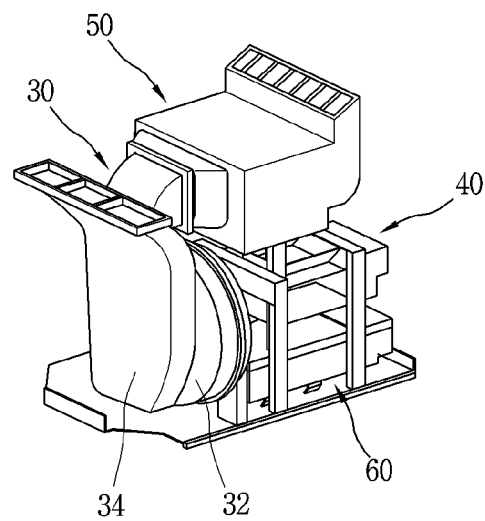
FIG. 2 is a perspective view of a some components of the clothes treating apparatus illustrated in FIG. 1.
Figure 3:
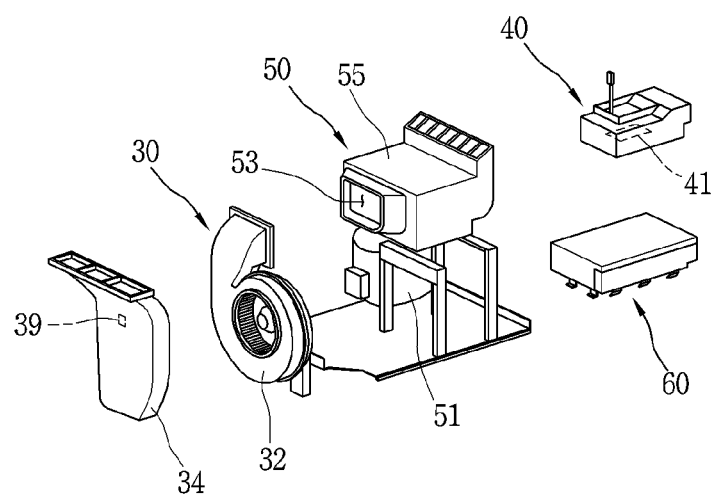
FIG. 3 is an exploded perspective view of some components of the clothes treating apparatus illustrated in FIG. 1.
Figure 4:
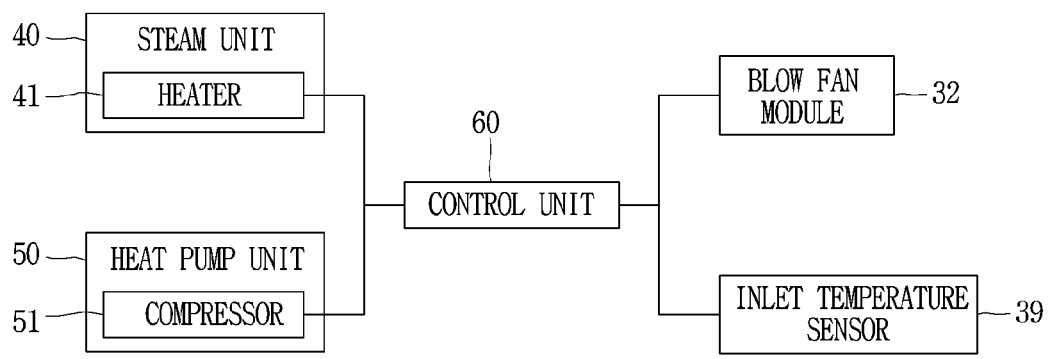
FIG. 4 is a block diagram of the clothes treating apparatus illustrated in FIG. 1.

FIG. 1 is a perspective view of a clothes treating apparatus according to an embodiment of the present disclosure; FIG. 2 is a perspective view of some components of the clothes treating apparatus illustrated in FIG. 1; FIG. 3 is an exploded perspective view of some components of the clothes treating apparatus illustrated in FIG. 1; and FIG. 4 is a block diagram of the clothes treating apparatus illustrated in FIG. 1.

The clothes treating apparatus according to an embodiment of the present disclosure includes a case 10 including a treatment chamber 12 for holding clothes, a steam unit 40 for supplying steam to the treatment chamber 12, a blowing unit 30 for intaking air from the inside of the treatment chamber 12, an inlet temperature sensor 39 measuring an inlet temperature of air entering to the blowing unit 30, a heat pump unit 50 for heating air drawn in by the blowing unit 30 and discharging heated air to the treatment chamber 12, and a control unit 60 controlling the steam unit 40, the blowing unit 30, and the heat pump unit 50.

Case 10 has a separator 11 dividing the inside of the case 10 vertically. Treatment chamber 12 for holding clothes is provided above the separator 11 and a cycle chamber 14 in which a mechanical device is installed is provided below the separator 11.

The case has a door opening and closing a front side of the case 10.

The treatment chamber 12 holds clothes where wrinkles are removed or clothes are deodorized through steaming, air circulation, drying, and the like.

Installed in the cycle chamber 14, blowing unit 30 draws in air from the inside of the treatment chamber 12 and circulates the air, steam unit 40 supplies steam to treatment chamber 12, heat pump unit 50 supplies heated air to treatment chamber 12, and control unit 60 controls units 30, 40, and 50.

Blowing unit 30 intakes air from the inside of the treatment chamber 12 under the control of control unit 60. Air drawn into blowing unit 30 is discharged to heat pump unit 50.

Blowing unit 30 includes a blowing fan module 32 moving air through rotation of a fan to intake air from the inside of the treatment chamber 12 and subsequently discharge the air to heat pump unit 50 and an inlet duct 34 installed on an intaking side of the blowing fan module 32 for guiding air within the treatment chamber 12 to blowing fan module 32.

One side of inlet duct 34 is connected to treatment chamber 12 and the other side thereof is connected to blowing fan module 32. The inlet temperature sensor 39 measures an inlet temperature value of air moving within the inlet duct 34 and is provided within the inlet duct 34 and transfers the measured inlet temperature to the control unit 60.

One side of blowing fan module 32 is connected to inlet duct 34, and the other side thereof is connected to heat pump unit 50. Blowing fan module 32 is a single module including a fan (e.g., a sirocco fan), a duct, and a motor.

Steam unit 40 supplies steam to treatment chamber 12 under the control of control unit 60. Steam unit 40 is heated by power applied thereto, receives water stored in a storage tank and heats the received water to convert the water into steam.

Steam generated by steam unit 40 is discharged to treatment chamber 12. In the present embodiment, steam generated by the steam u nit 40 moves to treatment chamber 12 through a flow channel of the heat pump unit 50. That is, steam unit 40 is preferably connected to heat pump unit 50.

Steam unit 40 includes a heater 41 heating water. Steam unit 40 performs preheating to first heat heater 41 and subsequently generates steam under the control of control unit 60.

Heat pump unit 50 heats air drawn in by the blowing unit 30 and discharges the heated air to the inside of treatment chamber 12 under the control of control unit 60.

Heat pump unit 50 is configured as a refrigerating cycle including a compressor 51, a condenser 53, an evaporator (not shown), and an expansion valve (not shown), and includes a heat pump flow channel 55, in which the condenser 53 is installed, forming a flow channel.

Compressor 51 compresses a refrigerant to a high temperature and high pressure state. Condenser 53 heat-exchanges the refrigerant compressed in compressor 51 with air from the blowing unit 30 to heat air. The expansion valve expands the refrigerant condensed in the condenser, and the evaporator evaporates the refrigerant expanded in the expansion valve to collect the refrigerant by compressor 51.

One side of the heat pump flow channel 55 is connected to blowing fan module 32 of blowing unit 30, and the other side thereof is connected to treatment chamber 12. Condenser 53 is disposed within the heat pump flow channel 55.

A tank module 70 storing water is installed in front of cycle chamber 14, and in the present embodiment, a tank module frame 71 in which the tank module 70 is installed is installed in front of inlet duct 34.

Tank module 70 includes a storage tank 80 storing water to be supplied to steam unit 40 and a drain tank 90 collecting and storing condensate generated in the treatment chamber 12. Storage tank 80 is connected to steam unit 40 to supply water, and drain tank 90 is connected to treatment chamber 12 and stores water condensed in the treatment chamber 12 or the heat pump unit 50.

Control unit 60 receives an inlet temperature from the inlet temperature sensor 39. Control unit 60 performs each operation to treat clothes in the clothes treating apparatus according to a preset course by controlling steam unit 40, blowing unit 30, and heat pump unit 50 according to a user setting or an inlet temperature. Each operation to treat clothes will be described with reference to FIG. 5 hereinafter.

Control unit 60 controls an operation of heat pump unit 50 on the basis of a preheating inlet temperature measured by the inlet temperature sensor 39 by operating the blowing unit 30, while preheating the steam unit 40.

Figure 5:
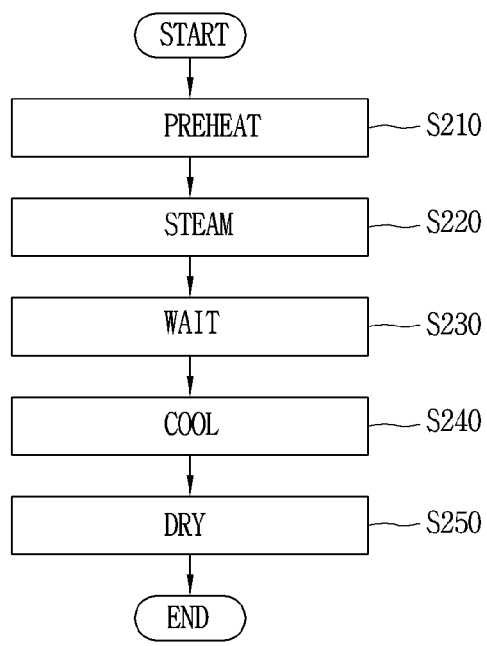
FIG. 5 is a flow chart illustrating an operation of a clothes treating apparatus according to an embodiment of the present disclosure.

FIG. 5 is a flow chart illustrating an operation of a clothes treating apparatus according to an embodiment of the present disclosure.

In FIG. 5, operations of a general course are illustrated, and some of operations may be omitted or the order of the operations may be interchanged.

When a user starts to operate the clothes treating apparatus, control unit 60 performs a preheating operation to preheat heater 41 of steam unit 40 by supplying power to the heater 41 (S210).

In the preheating operation (S210), control unit 60 operates the blowing fan module 32 of blowing unit 30. When blowing fan module 32 operates, the inlet temperature sensor 39 measures the temperature of air drawn into the inlet duct 34 of blowing unit 30 and transfers the measured preheating inlet temperature to control unit 60.

When preheating of heater 41 is completed, control unit 60 performs a steam operation (S220). Control unit 60 supplies water stored in storage tank 80 to steam unit 40 to generate steam, and supplies steam to the inside of treatment chamber 12. Control unit 60 operates the blowing fan module 32 to circulate air within treatment chamber 12. During the steam operation (S220), heat pump unit 50 does not operate.

When a preset period of time has elapsed, control unit 60 stops operation of steam unit 40 to terminate the steam operation (S220).

After the steam operation (S220), control unit 60 performs a standby operation (or waiting operation) (S230) and a cooling operation (S240). After the operation of steam unit 40 is stopped, control unit 60 performs the standby operation (S230) such that steam may be sufficiently applied to the clothes, while rotating blowing fan module 32 at a relatively low RPM.

When a preset period of time has elapsed, control unit 60 performs a cooling operation (S240) to decrease the temperature within treatment chamber 12, while rotating blowing fan module 32 at a relatively high RPM.

When a preset period of time has elapsed, control unit 60 terminates the cooling operation (S240).

After the cooling operation (S240), control unit 60 performs a dry operation (S250) to supply heated air to the inside of treatment chamber 12 by driving blowing fan module 32 and driving compressor 51 of heat pump unit 50.

Hereinafter, a general clothes treating apparatus having an electronic water supply valve will be described with reference to FIG. 6.

An electronic water supply valve 604, a water supply pump 605, and the storage tank 80 may be connected to a flow channel delivering water to the steam unit 40.

First, the electronic water supply valve 604 may be opened or closed on the basis of an electrical signal generated by the control unit 60. That is, the control unit 60 may generate a driving current having a predetermined current value to open or close the electronic water supply valve 604.

Storage tank 80 may temporarily store water before delivering water to steam unit 40. Also, water supply pump 605 may generate driving power to supply water to steam unit 40.

Control unit 60 may adjust an amount of water supplied to a water supply tank by controlling at least one of an operation time of the water supply pump 605 and an opening time of the electronic water supply valve 604.

However, since electronic valve 604 is relatively costly, manufacturing cost of the clothes treating apparatus is increased.

Additionally, in order to drive the electronic valve 604, a control signal having a predetermined current value is required to be received from control unit 60, which may be a limiting factor in designing the control unit 60.

Thus, hereinafter, a clothes treating apparatus having a mechanical valve unit according to an embodiment of the present disclosure will be described.

Figure 7A:
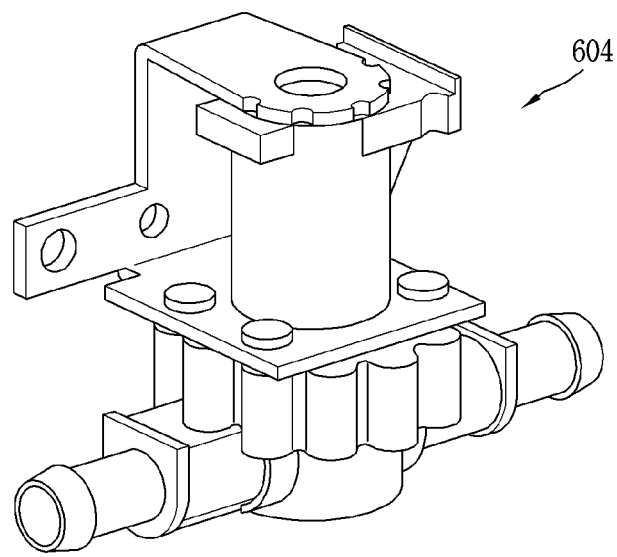
FIG. 7A is a conceptual view illustrating an electronic valve installed in the related art clothes treating apparatus.
Figure 7B:
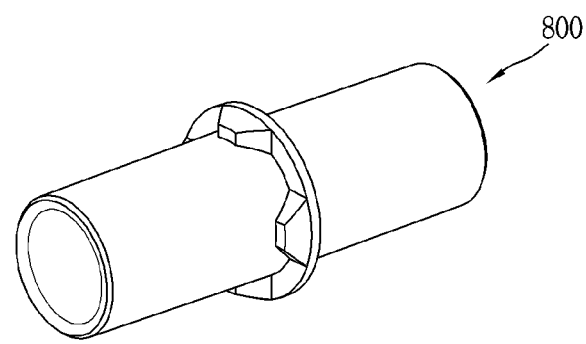
FIG. 7B is a conceptual view illustrating a valve unit installed in a clothes treating apparatus according to an embodiment of the present disclosure.

FIG. 7A illustrates the electronic valve 604 provided in the existing clothes treating apparatus and FIG. 7B illustrates a valve unit 800 according to an embodiment of the present invention.

As illustrated in FIGS. 7A and 7B, in order for electronic valve 604 to normally operate, the electronic valve 604 should receive a control signal from control unit 60, and thus, electronic valve 604 includes a component for electrical connection with control unit 60.

Additionally, since electronic valve 604 has a volume and a weight greater than valve unit 800 according to the present disclosure, the electronic valve 604 includes a fastening unit formed to be fastened to a surface of the clothes treating apparatus.

By replacing electronic valve 604 with valve unit 800, a design of the flow channel connecting the storage tank 80, the water supply pump 605, and the steam unit 40 may be freely changed.

Figure 7C:
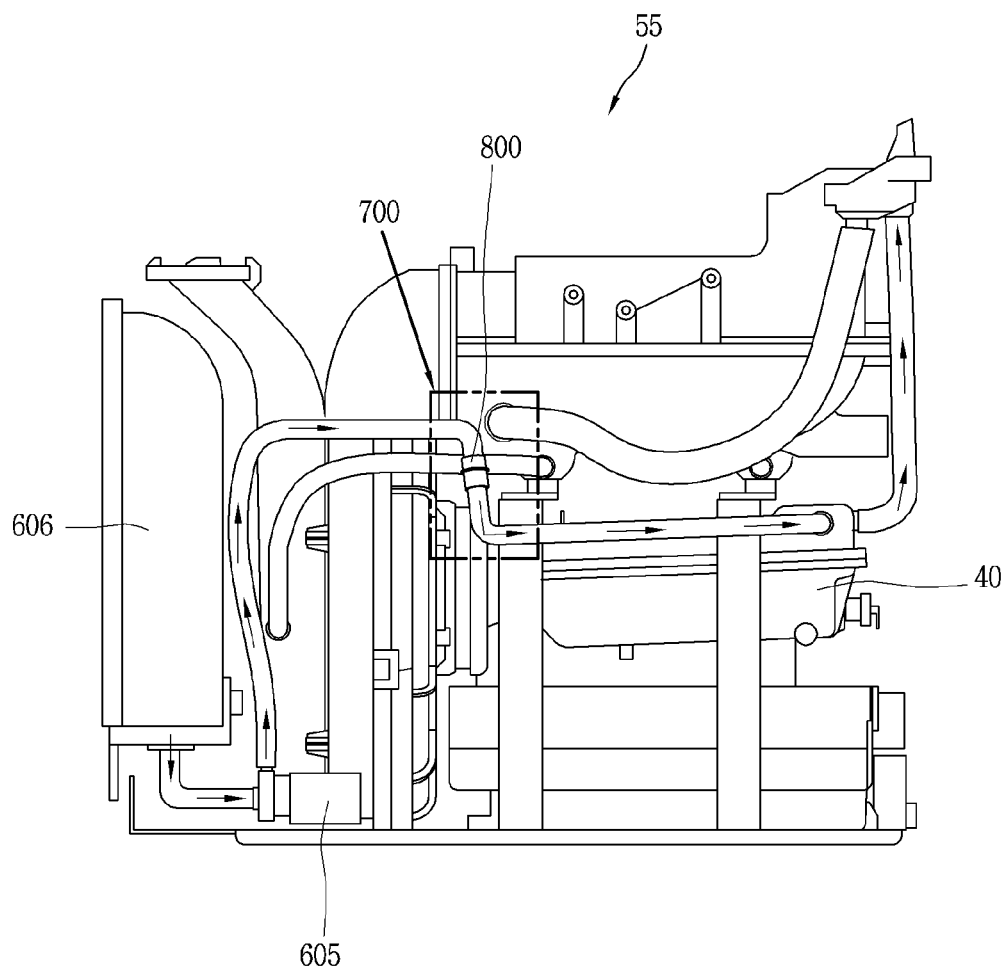
FIG. 7C is a conceptual view illustrating a clothes treating apparatus having a mechanical valve according to an embodiment of the present disclosure.

FIG. 7C is a conceptual view illustrating a clothes treating apparatus having valve unit 800 according to an embodiment of the present disclosure.

Figure 6:
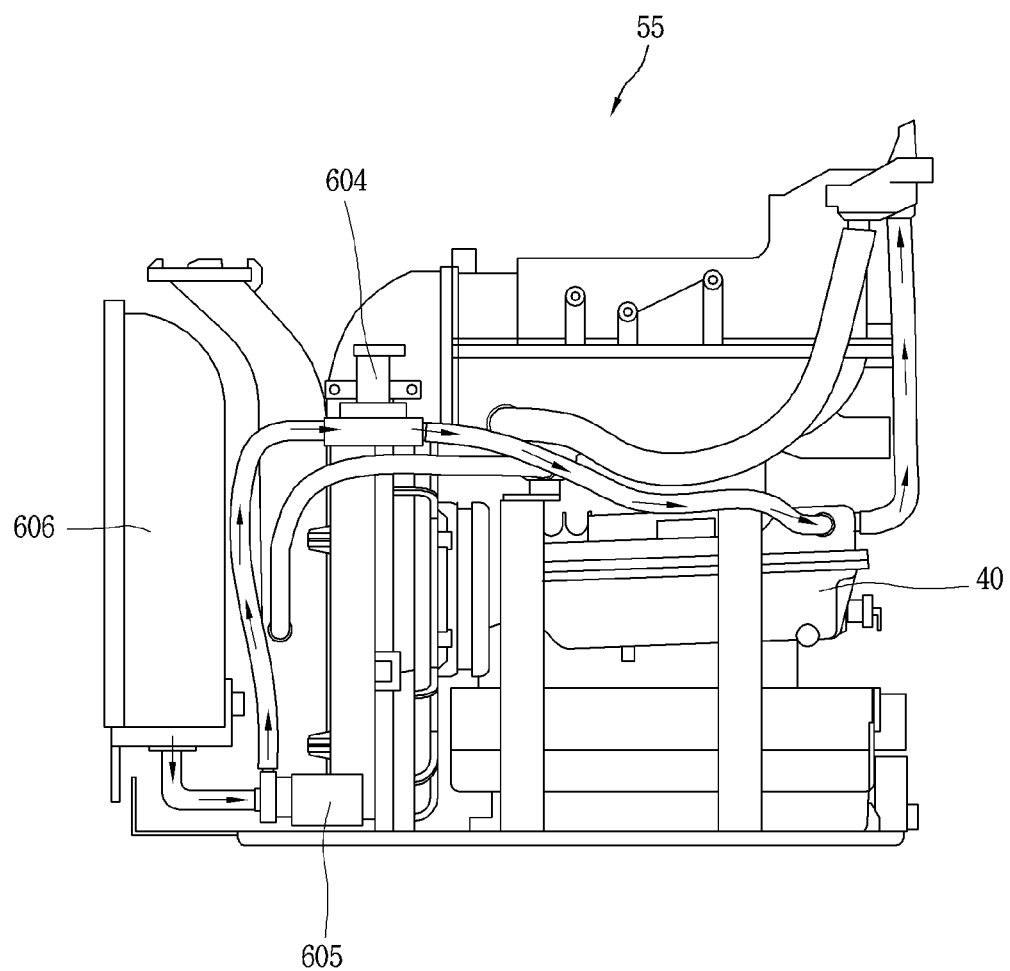
FIG. 6 is a conceptual view illustrating a general clothes treating apparatus having an electronic valve.

When the general clothes treating apparatus illustrated in FIG. 6 and the clothes treating apparatus according to the present disclosure illustrated in FIG. 7C are compared, electronic valve 604 is replaced with valve unit 800 in the present disclosure.

Valve unit 800 may be disposed in a flow channel connecting storage tank 80, water supply pump 605, and steam unit 40.

Referring to FIG. 7C, a portion of the flow channel in which the valve unit 800 is disposed may be formed in a vertical direction. For example, in a portion of the flow channel in which valve unit 800 is installed, water delivered from an upper side by the water supply pump 604 may flow downwards.

More specifically, the flow channel in which valve unit 800 is disposed may be connected to water supply pump 605 disposed below valve unit 800 and extends to a position higher than a position of valve unit 800. Also, the flow channel may be bent from a point higher than the position of valve unit 800 and extend in a vertical direction with respect to the ground so as to be connected to valve unit 800. That is, the flow channel may be formed such that an outlet B of valve unit 800 is oriented towards the ground.

The design of the flow channel is changed in consideration of structural characteristics of valve unit 800. When the flow channel is thus designed, valve unit 800 may be configured to constantly open the flow channel due to an influence of gravity when there is no flow in the flow channel as water is not supplied and steam is not generated.

Figure 8:
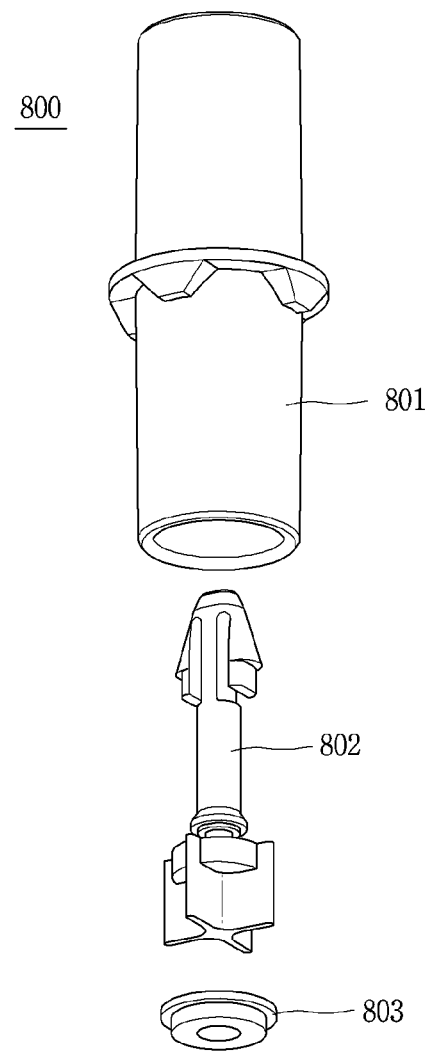
FIG. 8 is a conceptual view specifically illustrating components of a valve unit according to an embodiment of the present disclosure.

FIG. 8 illustrates the valve unit 800 according to an embodiment of the present disclosure.

As illustrated in FIG. 8, valve unit 800 may include a plurality of components.

Specifically, valve unit 800 may include a main body 801, a rod member 802, and a sealing member 803.

Referring to FIG. 8, the main body 801 may have a hollow portion therein. An inlet and an outlet of main body 801 may be connected to the flow channel as illustrated in FIG. 7C.

For example, a flexible pipe forming the flow channel may be inserted into the inlet and the outlet of the main body 801.

Also, rod member 802 illustrated in FIG. 8 may be movable within main body 801.

In detail, rod member 802 may be formed to be movable within the hollow portion of main body 801. Additionally, as rod member 802 is moved within the hollow portion, rod member 802 may open or close the hollow portion. That is, valve unit 800 may open or close the flow channel according to movement of rod member 802 within the hollow portion.

Sealing member 803 may be coupled to rod member 802. Sealing member 803 may be coupled to rod member 802 such that sealing member 803 is positioned between rod member 802 and main body 801.

Meanwhile, in the embodiment illustrated in FIG. 8, valve unit 800 has a cylindrical shape but an appearance of valve unit 800 is not limited thereto. That is, valve unit 800 may have a different shape according to a cross-section of the flow channel. However, for the purposes of description, a cylindrical valve unit 800 will be described hereinafter.

Valve unit 800 may open or close the flow channel by at least one of water and steam flowing in the flow channel.

In detail, when water supply pump 605 operates, valve unit 800 may open the flow channel by water flowing in the flow channel.

Also, when steam unit 40 generates steam, valve unit 800 may close the flow channel by the generated steam.

Valve unit 800 illustrated in FIG. 8 may be a mechanical valve operating independently from control unit 60.

More specifically, valve unit 800 may be a mechanical valve implemented in a first state in which the flow channel is opened and a second state in which the flow channel is closed.

The first state and the second state of valve unit 800 will be described in detail with reference to FIGS. 12A to 12C.

For example, valve unit 800 may open or close the flow channel according to a relative position of rod member 802 within main body 801.

In another example, valve unit 800 may open or close the flow channel according to a movement direction of rod member 802 within main body 801.

In yet another example, valve unit 800 may open or close the flow channel as a portion of rod member 802 in contact with main body 801 is changed according to movement of the rod member 802 within the main body 801.

Main body 801, rod member 802, and sealing member 803 may be provided as independent components, and the user may couple the rod member 802 and the sealing member 803 by inserting the sealing member 803 to the rod member 802. Also, the user may insert the coupled rod member 802 and sealing member 803 into the inside of main body 801 until the coupled body is attached to a portion of main body 801 thus coupling the coupled body to the main body 801. Through this process, valve unit 800 may be formed as an assembly of main body 801, rod member 802, and sealing member 803.

Main body 801 of valve unit 800 will be described in detail with reference to FIGS. 9A to 9D.

Figure 9A:
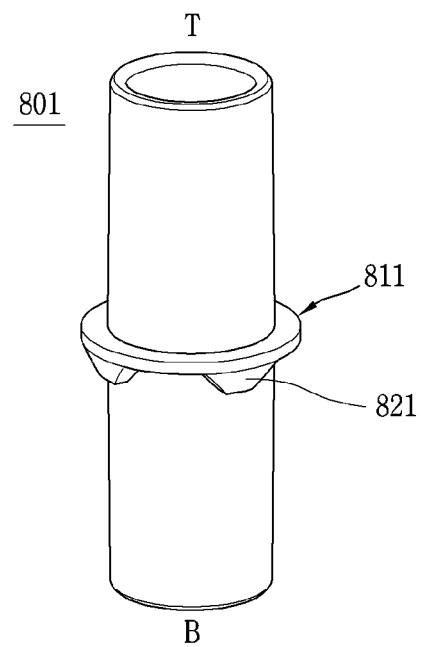
FIGS. 9A to 9D are views illustrating a main body of a valve unit according to an embodiment of the present disclosure.

First, FIG. 9A is a perspective view of main body 801.

Referring to FIG. 9A, main body 801 of valve unit 800 may have an inlet T formed to be adjacent to storage tank 80 and an outlet B formed to be adjacent to steam unit 40.

Also, main body 801 may have a first ring 811 protruding from an outer circumferential surface of the main body 801.

In detail, a first rib 821 may be provided on one surface of the first ring 811 and protrude from one surface of the first ring 811 in a flow direction of water.

For example, first rib 821 may be provided on one surface of first ring 811 adjacent to first ring 811.

Figure 9B:
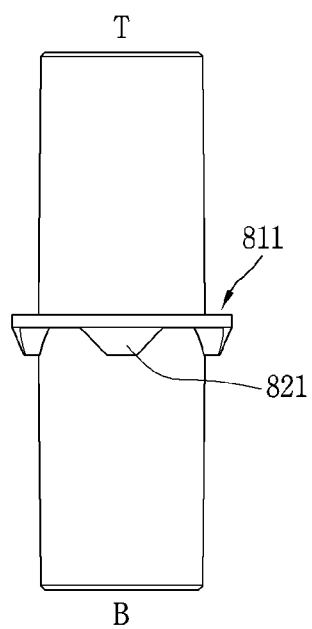

FIG. 9B is a front view of the main body 801.

Referring to FIG. 9B, a width of the first rib 821 may become narrower toward the outlet B formed to be adjacent to steam unit 40. First rib 821 may represent a flow direction of water within the flow channel.

Figure 9C:
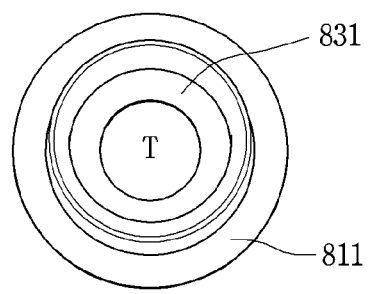
Figure 9D:
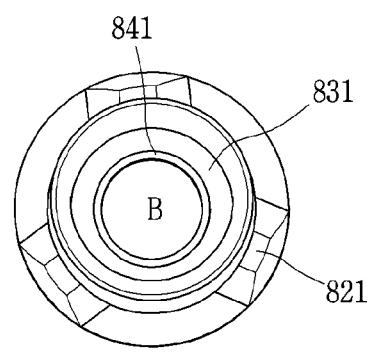

FIG. 9C is a top view of main body 801 and FIG. 9D is a bottom view of main body 801.

Referring to FIG. 9C, main body 801 may have a second ring 831 protruding from an inner circumferential surface of the main body 801.

Referring to FIG. 9D, a second rib 841 may be provided on one surface of the second ring 831 and protrude from one surface of the second ring 831 in a flow direction of water.

For example, second rib 841 may have a ring shape and a circle formed by second rib 841 may correspond to a circle formed by the second ring 831. Also, second rib 841 may be provided on one surface of the second ring 831 adjacent to outlet B.

In one embodiment, second rib 841 may be in contact with rod member 802.

Rod member 802 of valve unit 800 will be described in detail with reference to FIGS. 10A to 10D.

Figure 10A:
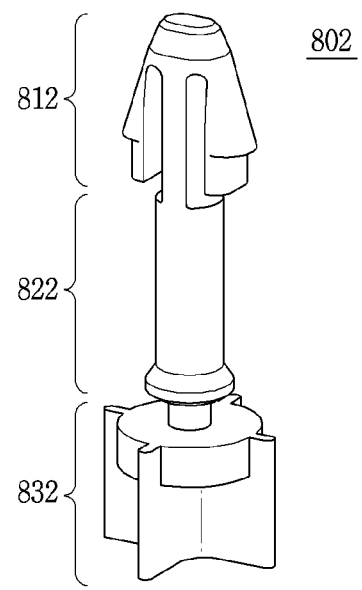
FIGS. 10A to 10D are views illustrating a rod member of a valve unit according to an embodiment of the present disclosure.

FIG. 10A is a perspective view of rod member 802.

As illustrated in FIG. 10A, rod member 802 may include a first part 812, a second part 822, and a third part 832.

In detail, first part 812 of rod member 802 may be provided at an end of rod member 802 adjacent to storage tank 80 and may be caught by a portion of the main body 801 when water is supplied to the steam unit 40.

That is, first part 812 may be formed to be caught by a portion of the main body 801, while allowing water supplied by the water supply pump 605 to pass therethrough, thus limiting a movement range of the rod member 802 within the main body 801.

For example, first part 812 may be formed to be caught by the second ring 831 formed on an inner circumferential surface of the main body 801 when water is supplied to the steam unit 40. In particular, first part 812 may be caught by one surface of the second ring 831 adjacent to storage tank 80 when water is supplied to steam unit 40.

In another example, first part 812 may be formed to be mounted on a portion of main body 801 when steam unit 40 is static or when the water supply pump 605 is in an operational state.

Meanwhile, when FIGS. 8, 9, and 10A are compared, rod member 802 and main body 801 may be coupled such that one end having a relatively small width, among both ends of the rod member 802, points to the inlet T of main body 801.

That is, rod member 802 and main body 801 may be coupled such that the first part 812 of rod member 802 points to the inlet T of the main body 801.

Figure 10B:
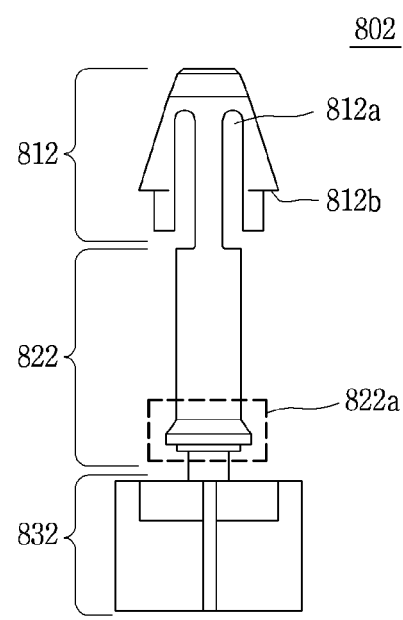
Figure 10C:
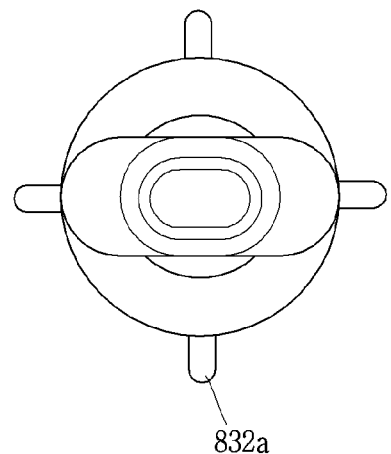
Figure 10D:
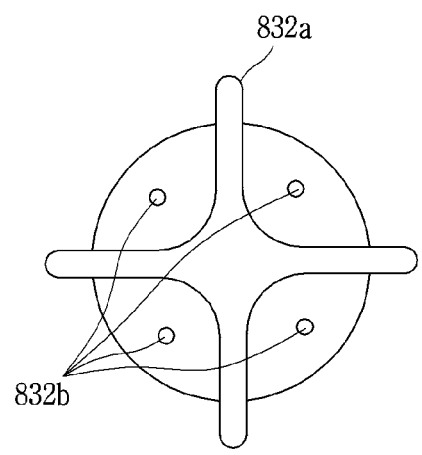

FIG. 10B is a front view of rod member 802, FIG. 10C is a plan view of rod member 802, and FIG. 10D is a bottom view of rod member 802.

Referring to FIG. 10B, first part 812 of rod member 802 may include at least one hole 812a and a hook 812b formed to be caught by the second ring 831.

In one embodiment, the hole 812a formed in the first part 812 may be formed on an inner circumferential surface of hook 812b.

In another embodiment, hook 812b included in the first part 812 may be mounted on one surface of the second ring 831 when the water supply pump 605 operates. Here, one surface of second ring 831 may face storage tank 80.

First part 812 of rod member 802 illustrated in FIG. 10B may be formed to be elastically deformed by an external force.

That is, first part 812 may be flexible by the hole 812a formed in the first part 812.

Thus, when main body 801 and rod member 802 are coupled, a width of the first part 812 may be temporarily reduced by an external force applied from the main body 801, and when the external force is removed, first part 812 may be restored to its original width.

Also, referring to FIG. 10B, one surface of the first part 812 of rod member 802 may be formed to be gentle to minimize resistance with respect to water flowing in the flow channel. That is, one surface of the first part 812 adjacent to water supply pump 605 may have a streamlined shape.

In one embodiment, one end of the first part 812 of rod member 802 adjacent to storage tank 80 may be narrower than one end of the first part 812 adjacent to the steam unit 40. That is, one end of the first part 812 adjacent to inlet T may be narrower than one end of the first part 812 adjacent to outlet B.

With respect to the first part 812 illustrated in FIG. 10B, a longitudinal cross-section of the first part 812 may substantially correspond to a trapezoid.

For example, a width of one end of the first part 812 of rod member 802 adjacent to storage tank 80 may be smaller than a diameter of a circle formed by the second ring 831. That is, a width of one end of the first part 812 of rod member 802 adjacent to inlet T of main body 801 may be smaller than a diameter of a circle formed by the second ring 831.

In another example, a width of a largest portion of the first part 812 of rod member 802 is greater than a diameter of the circle formed by the second ring 831. That is, a maximum width of the first part 812 formed by hook 812b of the first part 812 may be greater than the diameter of the circle formed by the second ring 831.

Meanwhile, the width of the largest portion of the first part 812 may be smaller than a circle formed by an inner circumferential surface of main body 801.

Referring to FIG. 10C, a cross-section of the first part 812 may be smaller than a cross-section of the third part 832. That is, the cross-section of the first part 812 may be smaller than an area of a circle formed by the second ring 831.

Referring back to FIG. 10B, the second part 822 of rod member 802 corresponds to a shaft supporting rod member 802 and the shaft may have a damper 822a formed to fix the sealing member 803.

Referring to FIGS. 10B to 10D, the third part 832 of rod member 802 may be connected to the second part 822 of the rod member 802 and transmit pressure of steam generated by the steam unit 40 to rod member 802.

Also, the third part 832 may guide a direction in which the rod member 802 is oriented, whereby rod member 802 is prevented from being restrained by a portion of main body 801 when moving within main body 801.

Also, the third part 832 may prevent a foreign object from being inserted between rod member 802 and main body 801, thus assisting rod member 802 to smoothly move within main body 801.

More specifically, as illustrated in FIG. 10C, the third part 832 of rod member 802 may include third ribs 832a radially protruding from rod member 802.

In one embodiment, the third ribs 832a may be formed to prevent rod member 802 from being restrained within main body 801 due to a foreign object present within the hollow portion of main body 801.

In another embodiment, the third ribs 832a may guide a direction in which rod member 802 is oriented, when rod member 802 moves within main body 801.

For example, the third ribs 832a radially protrude from rod member 802 such that the third ribs 832a are spaced apart from an inner circumferential surface of main body 801 by a predetermined distance or smaller. Accordingly, the third ribs 832a may guide a direction in which rod member 802 is oriented such that the direction in which rod member 802 is oriented is not tilted at a predetermined angle or greater from a predetermined reference axis penetrating through the inside of main body 801. Here, the direction in which rod member 802 is oriented may correspond to a central axis of the second part 822.

Also, when the third ribs 832a are formed to be spaced apart from the inner circumferential surface of main body 801 by a predetermined distance or smaller, a foreign object is prevented from being caught between the third ribs 832a and the inner circumferential surface of the main body 801.

Meanwhile, referring to FIG. 10D, the third part 832 of the rod member 802 may have a base member 832b provided in a portion thereof connected to the second part 822 and receiving pressure of steam generated by steam unit 40.

For example, the third ribs 832a having a cross shape may be provided on one surface of the base member 832b adjacent to steam unit 40.

When the base member 832b receives pressure of steam, rod member 802 may move toward inlet T of main body 801 or storage tank 80 within the hollow portion of main body 801.

In detail, base member 832b may be formed to be spaced apart from an inner circumferential surface of main body 801 by a predetermined distance or smaller.

For example, referring to FIG. 10D, when main body 801 has a cylindrical shape, base member 832b may be formed as a circular plate.

However, a shape of the base member 832b is not limited thereto and the base member 832b may have any shape as long as it can maximize an area of one surface of the base member 832b exposed to outlet B of main body 801.

Hereinafter, sealing member 803 of valve unit 800 will be described in detail with reference to FIGS. 11A to 11O.

Figure 11A:
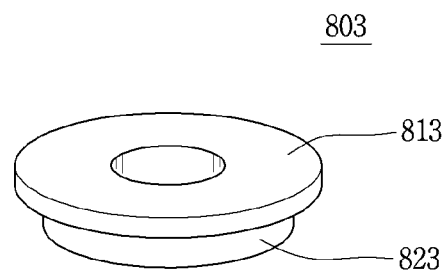
FIGS. 11A to 11C are views illustrating sealing of a valve unit according to an embodiment of the present disclosure.

FIG. 11A is a perspective view of sealing member 803.

Sealing member 803 illustrated in FIG. 11A may be formed to be tightly attached to one surface of the second ring 832 to close the hollow portion of main body 801 when rod member 802 moves toward storage tank 80 or toward inlet T of main body 801 by air pressure of steam generated by steam unit 40.

In detail, sealing member 803 may be tightly attached to one surface of the second ring 831 adjacent to steam unit 40 or adjacent to outlet B of main body 801

For example, when rod member 802 moves toward inlet T of main body 801 by air pressure of steam, the sealing member 803 may be tightly attached to the second rib 841 provided in the second ring 831.

Also, referring to FIG. 11A, sealing member 803 may include a first plate 813 and a second plate 823. The first plate 813 may be positioned to be closer to the inlet T of the main body 801 than the second plate 823. That is, the first plate 813 may be positioned above the second plate 823.

Figure 11B:
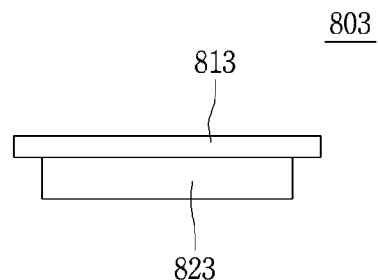

FIG. 11B is a front view of the sealing member 803.

Referring to FIG. 11B, the first plate 813 may be greater than the second plate 823. That is, the first plate 813 of the sealing member 803 according to the present disclosure may be formed to be as large as possible within a range in which movement of rod member 802 is not interfered, in order to receive more air pressure by steam.

Referring to FIG. 11B, the second plate 823 may be formed to be thicker than the first plate 813. By forming the second plate 823 positioned on a lower surface of the first plate 813 to be relatively thick, damage to the sealing member 803 may be prevented. That is, when the sealing member 803 passes through the damper 822a provided in the second part 822 of the rod member 802 during a process in which the sealing member 803 is coupled to the rod member 802, since the second plate 823 is relatively thick, damage to the sealing member 803 may be prevented.

Figure 11C:
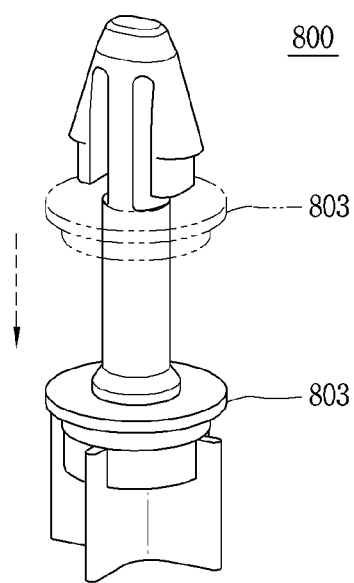

FIG. 11C illustrates an embodiment of coupling the sealing member 803 and rod member 802.

As illustrated in FIG. 11C, sealing member 803 and rod member 802 may be coupled. In particular, sealing member 803 may be formed to be elastically deformed by an external force so as to be inserted into the second part 822 of rod member 802.

Figure 12A:
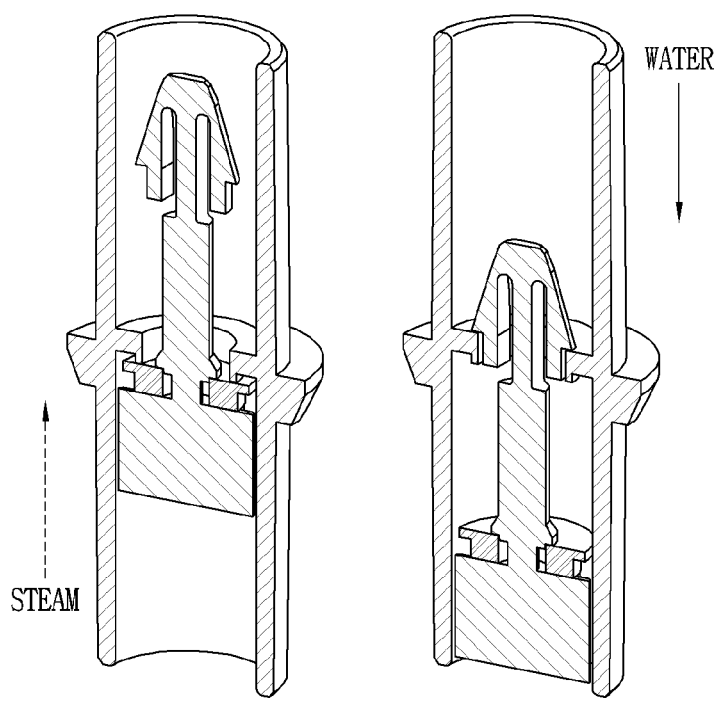
FIGS. 12A to 12C are conceptual views illustrating a movement state of a rod member within a valve unit according to an embodiment of the present disclosure.
Figure 12B:
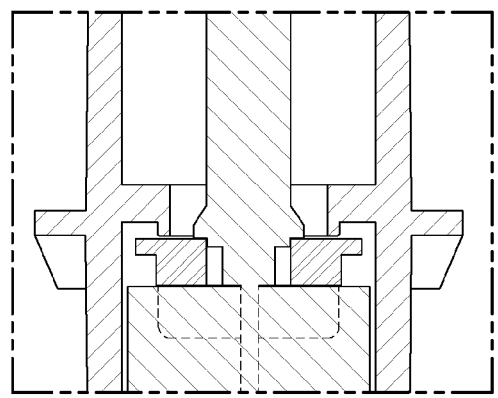
Figure 12C:
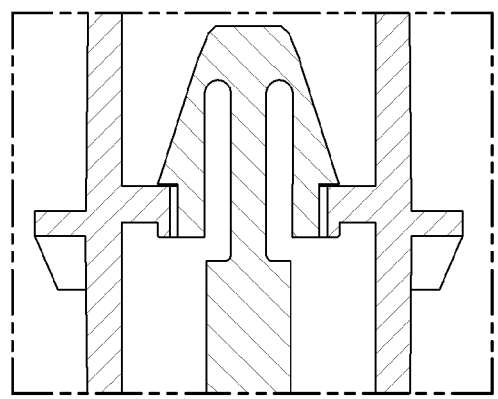

FIGS. 12A to 12C are conceptual views illustrating an operational state of valve unit 800 changed according to movement of rod member 802 in the hollow portion of main body 801.

Referring to FIG. 12A, rod member 802 may move to open or close the flow channel by at least one of water and steam flowing in the hollow portion of the main body 801.

In detail, rod member 802 may move within a limited range in a space formed in the hollow portion of main body 801.

When a water supply operation starts, rod member 802 may start to move toward outlet B of main body 801 using pressure based on supplied water. Here, the rod member 802 may move within main body 801 until the first part 812 of rod member 802 is caught by the second ring 831.

When the hook 812b formed in the first part 812 is caught by the second ring 831, rod member 802 may not move toward the outlet B any longer and allows water to flow through the hole 812a formed in the first part 812.

When a steam operation starts, rod member 802 may start to move toward inlet T of main body 801 using air pressure based on generated steam. Here, rod member 802 may move within main body 801 until the sealing member 803 provided in the second part 812 of the rod member 802 is tightly attached to the second ring 831 of the main body 801.

When the sealing member 803 of the rod member 802 is tightly attached to the second ring 831, the rod member 802 may not move toward the inlet T any longer and prevent generated steam from flowing back toward the water supply pump 605.

In one embodiment, adhesion between the sealing member 803 and the second ring 831 may be lower than pressure of water introduced to the main body 801 when the water supply operation starts again after the steam operation terminates.

In another embodiment, adhesion between the sealing member 803 and the second ring 831 may be lower than gravity applied to the rod member 802 after the steam operation terminates.

Referring to FIG. 12A, valve unit 800 may be implemented in a first state in which rod member 802 moves toward steam unit 40 within the hollow portion of main body 801 to open the hollow portion to allow water supplied from storage tank 80 to flow and a second state in which rod member 802 moves toward storage tank 80 within the hollow portion to close the hollow portion to prevent a backflow of steam generated by steam unit 40.

Meanwhile, when FIGS. 7C and 12A are compared, a portion of the follow channel in which valve unit 800 is provided may be formed in a vertical direction with respect to the ground.

Here, valve unit 800 may be implemented in the first state in which rod member 802 moves downwards within the hollow portion of main body 801 to open the hollow portion to allow water supplied from storage tank 80 to flow when steam unit 40 is stopped and the second state in which rod member 802 moves upwards within the hollow portion to close the hollow portion to prevent a back flow of steam generated by steam unit 40 when steam unit 40 operates.

In detail, when both the water supply pump 605 and the steam unit 400 are stopped, rod member 802 may be positioned on a lower side within the hollow portion due to gravity. That is, when water or steam does not flow, rod member 802 may be under gravity to move downwards within main body 801 to open the hollow portion, implementing the first state.

Also, when steam is generated by steam unit 40, rod member 802 may move upwards within the hollow portion due to air pressure of generated steam. That is, when steam is generated, rod member 802 may move upwards within main body 801 by air pressure of steam to close the hollow portion, implementing the second state.

FIG. 12B illustrates valve unit 800 in the second state.

As illustrated in FIG. 12B, when steam is generated by the steam unit, rod member 802 may move toward inlet T of main body 801 by air pressure of generated steam.

When sealing member 803 and second ring 831 are tightly attached according to movement of rod member 802, valve unit 800 is closed, and thus, steam generated by the steam unit cannot pass through the second ring 831.

FIG. 12C illustrates valve unit 800 in the first state.

As illustrated in FIG. 12C, when water is supplied by the water supply pump, rod member 802 may move toward outlet B of main body 801 by pressure of the supplied water.

Even when the hook 812b is caught by the second ring 831 according to movement of rod member 802, water may pass through valve unit 800 through the hole 812a formed by the hook 812b.

According to the clothes treating apparatus of the present disclosure, since the mechanical valve, instead of an electronic valve, is provided in the flow channel connected to the steam unit, manufacturing cost may be reduced.

Also, according to the present disclosure, since an electronic valve is eliminated from the clothes treating apparatus, a driving current required for driving an electronic valve may be secured.

Also, according to the present disclosure, since the flow channel is opened when water is supplied to the steam unit and closed when steam is generated using the structural characteristics of the mechanical valve, a back flow of steam may be prevented.

Also, according to the present disclosure, although the mechanical valve is used, generation of an air layer in the flow channel connected to the valve when an operation of supplying water to the steam unit is performed and when the water supply operation terminates may be prevented.

That is, according to the structural characteristics of the valve of the present disclosure, since an air layer is not generated in the flow channel or the pump due to negative pressure after water supply to the steam unit terminates, stability of the clothes treating apparatus may be enhanced.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A clothes treating apparatus comprising:
   a case including a treatment chamber for holding clothes;
   a steam unit configured to supply steam to the treatment chamber;
   a storage tank storing water to be supplied to the steam unit;
   a valve unit disposed in a flow channel connecting the storage tank and the steam unit,
   wherein the valve unit includes a main body, a ring protruding from an inner circumferential surface of the main body, a rod member provided to be movable within the ring of the main body having a hollow portion, and a sealing member to close the hollow portion of the ring by attaching to the ring;
   a water supply pump configured to transmit water stored in the storage tank to the steam unit; and
   a control unit controlling the steam unit and the water supply pump,
   wherein the valve unit opens or closes the flow channel by at least one of water and steam flowing in the flow channel,
   wherein the rod member includes:
     a first part, a second part, and a third part,
     wherein the first part is provided at one end of the rod member adjacent to the storage tank and is caught by one surface of the ring when water is supplied,
     wherein the third part is provided at the other end of the rod member adjacent to the steam unit and supports the sealing member so that the sealing member is caught by a surface different from the one surface of the ring when steam is generated,
     wherein the second part is connected to the first part and the third part and includes a damper fixing the sealing member, and
     wherein a width of the second part is smaller than a diameter of an inner circumferential surface formed by the ring, and
   wherein the sealing member comprises:
     a first plate, and
     a second plate formed to be thicker than the first plate and to be positioned on a side surface of the first plate adjacent to the third part.

2. The clothes treating apparatus of claim 1, wherein when the water supply pump operates, the flowing water in the flow channel causes the valve unit to open.

3. The clothes treating apparatus of claim 1, wherein when the steam unit generates steam, the steam causes the valve unit to close.

4. The clothes treating apparatus of claim 1, wherein the valve unit is a mechanical valve operating independently from the control unit.

5. The clothes treating apparatus of claim 1, wherein the valve unit is implemented in
   a first state in which the rod member moves toward the steam unit within the hollow portion to open the hollow portion to allow water supplied from the storage tank to flow, and
   a second state in which the rod member moves toward the storage tank within the hollow portion to close the hollow portion to prevent a backflow of steam generated by the steam unit.

6. The clothes treating apparatus of claim 5, wherein the valve unit has a cylindrical shape and further comprises:
   a first rib protruding from one surface of the ring in a flow direction of water.

7. The clothes treating apparatus of claim 5, wherein the first part of the rod member includes:
   at least one hole; and
   a hook provided to be caught by the ring.

8. The clothes treating apparatus of claim 7, wherein the hole is provided on an inner circumferential surface of the hook.

9. The clothes treating apparatus of claim 7, wherein when the water supply pump operates, the hook rests on one surface of the ring adjacent to the storage tank.

10. The clothes treating apparatus of claim 5, wherein the first part of the rod member is elastically deformed by an external force.

11. The clothes treating apparatus of claim 5, wherein one surface of the first part of the rod member is formed to be gentle to minimize resistance with respect to water flowing in the flow channel.

12. The clothes treating apparatus of claim 11, wherein one end of the first part of the rod member adjacent to the storage tank is narrower than the other end of the first part adjacent to the steam unit.

13. The clothes treating apparatus of claim 11, wherein a width of one end of the first part of the rod member adjacent to the storage tank is smaller than a diameter of a circle formed by the ring, and a width of the other end of the first part of the rod member adjacent to the steam unit is larger than the diameter of the circle.

14. The clothes treating apparatus of claim 1, wherein a portion of the flow channel in which the valve unit is provided is formed in a vertical direction with respect to the ground, and
   wherein the valve unit is implemented in
     a first state in which the rod member moves downwards within the hollow portion to open the hollow portion to allow water supplied from the storage tank to flow when the steam unit is stopped, and
     a second state in which the rod member moves upwards within the hollow portion to close the hollow portion to prevent a backflow of steam generated by the steam unit when the steam unit operates.

15. The clothes treating apparatus of claim 14, wherein the rod member is positioned on a lower side within the hollow portion due to gravity when both the water supply pump and the steam unit are stopped.

16. The clothes treating apparatus of claim 15, wherein when steam is generated by the steam unit, the rod member moves upwards within the hollow portion by air pressure of the generated steam.

17. The clothes treating apparatus of claim 1, wherein the sealing member is formed to close the hollow portion by attaching to the surface different from the one surface of the ring adjacent to the steam unit, when the rod member moves toward the storage tank due to air pressure of steam generated by the steam unit.

* * * * *